Figure 1:
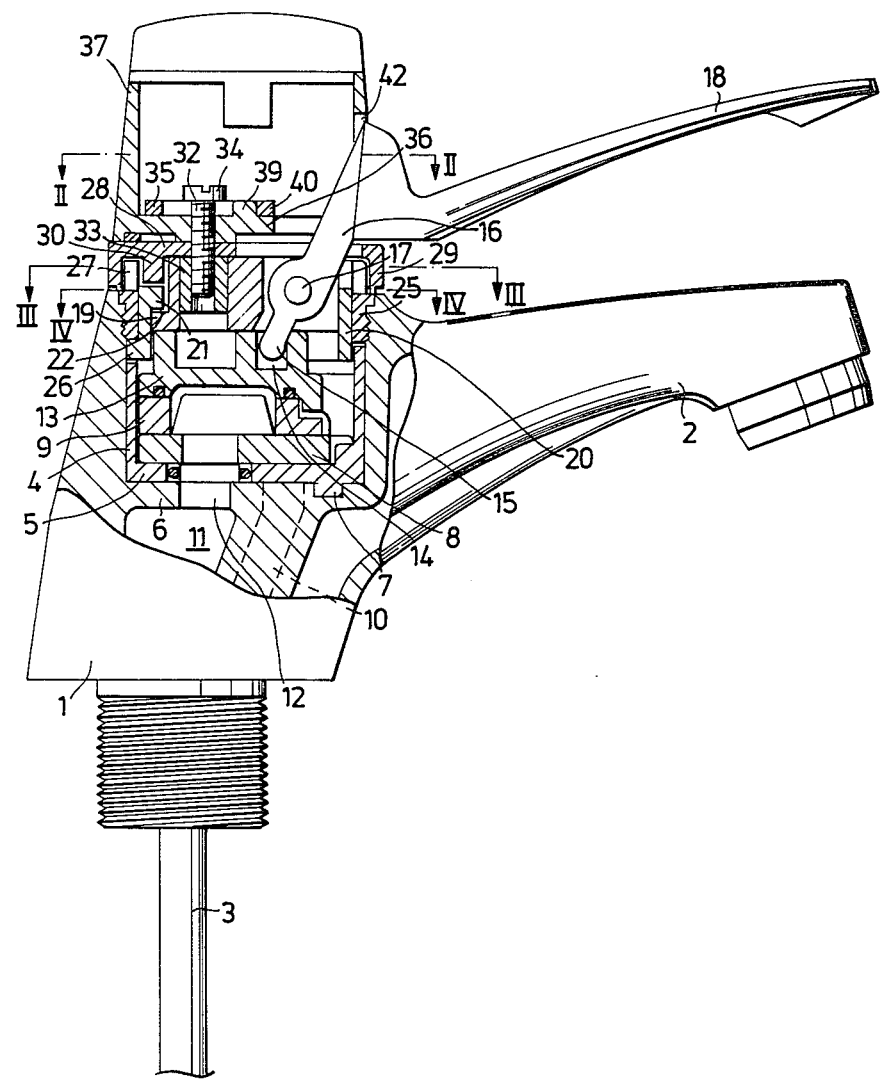

United States Patent [19]

Andersson

[11] 4,375,225

[45] Mar. 1, 1983

[54] MIXING VALVE

[75] Inventor: Sven Andersson, Vattnäs, Sweden

[73] Assignee: F M Mattsson AB, Mora, Sweden

[21] Appl. No.: 238,899

[22] Filed: Feb. 27, 1981

[30] Foreign Application Priority Data

Dec. 10, 1980 [SE] Sweden .............................. 8008688

[51] Int. Cl.³ ............................................ F16K 19/00
[52] U.S. Cl. .............................. 137/625.17; 251/285
[58] Field of Search .................... 137/625.17; 251/285

[56] References Cited

U.S. PATENT DOCUMENTS

| 3,373,770 | 3/1968 | Ward et al. | 137/625.17 |
| 3,433,264 | 3/1969 | Parkison | 137/625.17 |
| 3,559,684 | 2/1971 | Rudewick | 137/625.17 |
| 3,592,229 | 7/1971 | Moen | 137/625.17 |
| 3,964,514 | 6/1976 | Manoogian et al. | 137/625.17 |
| 3,965,936 | 6/1976 | Lyon | 137/625.17 |

Primary Examiner—Martin P. Schwadron
Assistant Examiner—John A. Rivell
Attorney, Agent, or Firm—Sughrue, Mion, Zinn, Macpeak and Seas

[57] ABSTRACT

A mixing valve of the single lever type having a valve housing (1) with a hot water inlet and a cold water inlet. The mixing ratio is determined by two valve plates (8,9) which are rotatable and displaceable relative to one another and which are guided by dogging means (14, 15, 19). A stop means (30), which can be locked relative to the dogging means, is arranged to co-act with an abutment means, which can be fixedly mounted relative to the dogging means, so as to restrict rotation of the dogging means towards a position in which the ratio of hot water and cold water fed to the mixing chamber increases, to a desired value.

3 Claims, 4 Drawing Figures

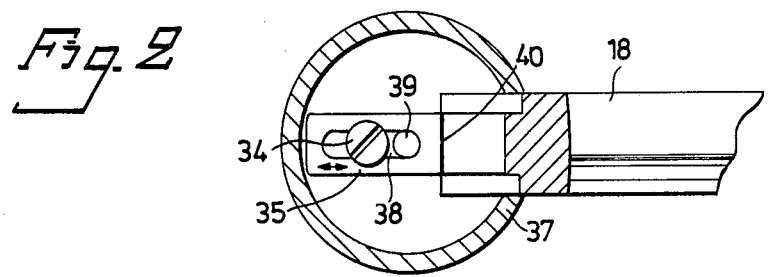
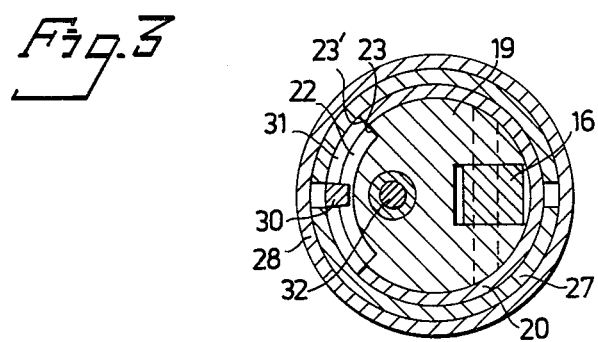
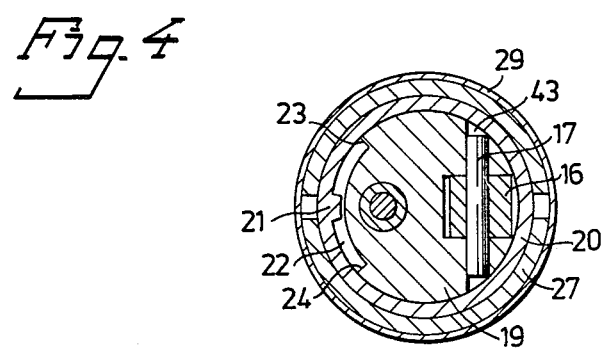

MIXING VALVE

The present invention relates to a mixing valve of the single-lever type, comprising a valve housing having a hot-water inlet and a cold-water inlet; a valve means including two valve plates which are displaceable relative to one another; a displaceable and rotatable dogging means which is controlled by said lever and which, when the lever is swung in a vertical plane, is arranged to impart to the valve plate a relative displacement movement to restrict the flow of water through the mixing valve, and which when the lever is moved in a horizontal plane is arranged to rotate said plates relative to one another such as to change the ratio between hot and cold water flowing to a mixing chamber; and restricting means for restricting the movement of said lever.

One problem encountered with mixer taps or valves of this kind, is the risk of being scalded when the lever is turned to the hot-water side of the tap, and the difficulty in controlling the maximum outflow therefrom. Since the temperature of the hot water entering the system varies greatly with different dwelling places, it is not possible to ensure that the water issuing from the tap is not scaldingly hot simply by supplying a constant flow of cold water to the tap. If attempts are made to constantly mix cold water with hot water in quantities which ensure that the mixture of hot and cold water is not hot enough to burn, the mixer tap will, in the majority of cases, deliver water which is too cold. Further, the possibilities of restricting the outflow of water from such mixer taps are particularly limited.

Consequently it is an object of the present invention to provide a mixer valve which through the medium of particularly simple means can be set so that the water issuing therefrom can never reach a scalding temperature at a given maximum temperature of the incoming water, and which enables the flow of water therefrom to be controlled.

This object is realized fully by means of the invention as defined in the following claims and as described hereinafter with reference to the accompanying drawings; in which drawings FIG. 1 is a vertical, central part-sectional view of a single-lever mixer valve according to the invention, FIG. 2 is a sectional view taken on the line II—II in FIG. 1, FIG. 3 is a sectional view taken on the line III—III in FIG. 1, and FIG. 4 is a sectional view taken on the line IV-IV in FIG. 1.

The mixer valve is provided with a valve housing 1 having an outlet pipe 2 and an inlet for cold water and an inlet for hot water, of which only the cold water inlet 3 is shown. Mounted in the interior of the valve housing is a substantially cylindrical valve sleeve 4 having a bottom 5 which rests on a wall 6 in the valve housing and which is provided with a stud 7, said stud being arranged to enter a hole in the wall 6 so as to prevent rotation of the valve sleeve 4. The bottom 5 supports a stationary valve plate 8 arranged to co-act with a rotatable and displaceable valve plate 9. The valve plate 8 is provided with a cold water inlet and a hot water inlet (not shown), each of which communicates with a respective inlet source of cold water and hot water. In FIG. 1, the reference 10 identifies the cold-water inlet pipe.

As is well known, the movable valve plate 9 is so arranged that when rotated the bottom surface of said plate, which abuts the upper surface of the fixed valve plate 8, covers one inlet opening to a greater extent than it does the other. By rotating the plate 9 in one direction, the amount of hot water allowed to pass through the hot water inlet is greater than that amount of water allowed to pass through the cold water inlet, while when turning the plate 9 in the opposite direction the opposite is true. In the illustrated embodiment, the hot water and cold water flow through a shallow passage in the under side of an operating plate 13 to a mixing chamber 11 and from there to the outlet of pipe or nozzle 2 via a channel 12. In order to regulate the amount of mixed hot and cold water leaving the tap, or valve, the valve plate 9 is displaceably arranged in a conventional fashion. When the plate is displaced to one side, the area of the two openings are increased proportionally the same, and the temperature of the water issuing from the tap or valve is therefore not changed. When the valve plate 9 is displaced linearly in the other direction, the area of the two inlet openings is decreased proportionally and the amount of water issuing through the spout 2 decreases, without the temperature of the mixture of hot and cold water being changed. As will be seen from FIG. 1, the operating plate 13, which is sealingly mounted on the valve plate 9, has arranged therein a recess 14 which receives one end of a dogging arm 16, which is pivotally mounted on a pivot 17 and connected to a lever 18. The pivot 17 is journalled in a groove 43 in a dogging element 19 pivotally mounted in the housing 1, said element being surrounded by a non-rotatable guide sleeve 20 having an inwardly directed stop shoulder 21. The stop shoulder 21 is arranged to slide in a groove 22 located in the rotatable dogging element 19 and having stop surfaces 23 and 24. The arrangement is such that when the dogging element 19 is turned by the lever 18 so that the shoulder 21 engages the stop surface 23, the movable valve plate 9 has been rotated to a corresponding extent and the maximum amount of cold water and the minimum amount of hot water is passed to the mixing chamber 11. When the stop shoulder 21 is moved into contact with the stop surface 24, the opposite is true, i.e. the maximum amount of hot water and the minimum amount of cold water enter the mixing chamber.

As will be obvious to those skilled in this art, the inlet openings of the fixed valve plate 8 may be connected to the hot and cold water pipes in a manner such that the reverse is true, i.e. that the greater amount of hot water is obtained when the stop shoulder 21 lies against the stop surface 23, and the greatest amount of cold water is obtained when the stop shoulder 21 lies against the stop surface 24. It is assumed in the following that the greatest quantity of hot water is obtained when the dogging element 19 is rotated clockwise in FIG. 4. The guide sleeve 20 is held fixed in the housing 1 by means of a nut 25 which is screwed into the housing and rests against bars, for example the bar 26 on the guide sleeve 20. The bars 26 extend into grooves on the upper edge of the valve sleeve 4.

Mounted on the nut 25 is a ring nippel 27. Surrounding the nipple 27 is an anti-scalding device which has the form of a disc 28 with an outer, downwardly directed flange 29 and which is provided with a stop means 30 extending through a recess 31 in the upper edge of the guide sleeve 20 and into the groove 22 in the illustrated embodiment, but need only project into the recess or groove 31 with its abutment surface 23', which is movable relative to the abutment surface 23. Stop means 30 overlaps the stop shoulder 21 and its purpose is to limit the amount of hot water mixed with the cold, by coaction with stop surface 23'. When the anti-scalding device occupies its locked position, the stop means 30 accompanies the movement of the dogging element 19. By rotating the anti-scalding device clockwise in FIG. 3, the stop means 30 thereof, which in FIG. 3 is located immediately above the fixed stop shoulder in FIG. 4, approaches the abutment surface 23', whereby clockwise rotation of the dogging element 19 decreases, i.e. less hot water is passed to the mixing chamber, because the valve plate cannot be moved to a fully open position while not fully throttling the cold water supply at the same time. The extent to which the anti-scalding device is rotated depends on the temperature of the incoming hot water, which is normally constant but varies from building to building. Thus, when the anti-scalding device is set correctly, it is impossible for a person to be scalded, irrespective of how hot the incoming hot water is. Subsequent to correctly setting the anti-scalding device, it is firmly locked by means of a screw which passes freely through an opening in the disc 28 of said device and into a fixed bush on the dogging element 19 and will thus be rotated together with said element 19. The head 34 of the screw 32 lies against a flow-limiting plate 35, which in turn rests against the bottom 36 of a cap 37. The flow-limiting plate 35 has an elongate groove 38 for receiving the screw 32, and a guide pin 39 projecting from the bottom 36 lies in the groove 38 so as, together with the screw 32, to guide the flow-limiting plate in a manner such that it can only be displaced in the longitudinal direction of the lever 18. The flow-limiting plate 35 has an abutment surface 40 which faces the upper part of the dogging arm 16 and which is arranged to co-act with said arm. By loosening the screw 32 and displacing the plate 35, it is possible to increase or decrease the extent to which the lever 18 can be swung vertically, i.e. to increase or decrease the quantity of mixed hot and cold water issuing from the tap. In order to allow the lever 18 to be lifted vertically, the cap 37, which has a readily removable cover, is provided with a lateral opening 42.

I claim:

1. A mixing valve of the single-lever type, comprising a valve housing (1) having a hot-water inlet and a cold-water inlet, a valve means including two valve plates (8,9) which are displaceable relative to one another; a displaceable and rotatable dogging means (14, 15, 19) which is controlled by said lever (18) and which, when the lever is swung in a vertical plane, is arranged to impart to the valve plates a relative displacement movement to restrict the flow of mixed hot and cold water through the mixing valve, and which when the lever is swung in a horizontal plane is arranged to rotate said plates (8,9) relative to one another such as to change the ratio of the hot and cold water flowing to a mixing chamber; and restricting means for restricting the movement of said lever, characterized in that a stop means (30) which can be set relative to the dogging means (19) in its direction of rotation and firmly locked thereto, is arranged to co-act with an abutment means (23') fixedly mounted relative said dogging means, to selectively restrict rotation of the dogging means towards a position in which the ratio of hot water to cold water entering the mixing chamber is increased to a desired value, said stop means (30) being mounted on a sleeve means (28) surrounding the dogging means (14, 15, 19), said sleeve means being rotatable and capable of being locked to the dogging means in selected positions, by means of locking means (32).

2. A mixing valve according to claim 1, characterized in that for the purpose of restricting vertical movement of the lever (18) and its movement towards a position in which the quantity of mixed hot and cold water leaving the valve increases, there is provided an abutment means (35) having an abutment surface (40) for coaction with said lever, said abutment means being arranged for movement in a cap (37) on the mixing valve in the longitudinal direction of the lever (18), and to be locked in selected positions of displacement by said locking means (32).

3. A mixing valve according to claims 1 or 2, characterized in that the abutment means comprises a plate (35) having arranged therein an elongate groove (38) which receives therethrough a locking screw (32) which, at the same time, is arranged to firmly lock said sleeve means (28).

* * * * *